United States Patent
Torres Tamanaja et al.

(10) Patent No.: US 10,718,878 B2
(45) Date of Patent: Jul. 21, 2020

(54) METHOD AND SYSTEM FOR HYDROSTATIC BALANCE CONTROL, BASED ON PRESSURE MODELLING, OF A MARINE SEISMIC VIBRATOR

(71) Applicant: CGG SERVICES SAS, Massy (FR)

(72) Inventors: Ivan Torres Tamanaja, Antony (FR); John J. Sallas, Plano, TX (US)

(73) Assignee: CGG SERVICES SAS, Massy (FR)

( * ) Notice: Subject to any disclaimer, the term of this patent is extended or adjusted under 35 U.S.C. 154(b) by 354 days.

(21) Appl. No.: 15/864,359

(22) Filed: Jan. 8, 2018

(65) Prior Publication Data

US 2019/0212461 A1    Jul. 11, 2019

(51) Int. Cl.
| | | |
|---|---|---|
| *G01V 1/38* | (2006.01) | |
| *G01V 1/18* | (2006.01) | |
| *G01V 1/04* | (2006.01) | |
| *G01V 1/135* | (2006.01) | |

(52) U.S. Cl.
CPC .............. *G01V 1/3826* (2013.01); *G01V 1/04* (2013.01); *G01V 1/135* (2013.01); *G01V 1/188* (2013.01); *G01V 2210/1293* (2013.01)

(58) Field of Classification Search
CPC ........ G01V 1/3826; G01V 1/135; G01V 1/04; G01V 1/188; G01V 2210/1293
See application file for complete search history.

(56) References Cited

U.S. PATENT DOCUMENTS

| | | | |
|---|---|---|---|
| 3,774,570 A * | 11/1973 | Pearson | G01V 1/3826 114/245 |
| 7,610,871 B2 | 11/2009 | Leclercq et al. | |
| 8,441,892 B2 | 5/2013 | Morozov et al. | |
| 8,830,794 B2 | 9/2014 | Ruet et al. | |
| 9,507,037 B2 | 11/2016 | Tenghamn et al. | |
| 9,535,180 B2 | 1/2017 | Sallas et al. | |
| 2014/0056108 A1 | 2/2014 | Chelminski | |
| 2014/0226439 A1 * | 8/2014 | Tenghamn | G01V 1/04 367/15 |
| 2014/0238773 A1 | 8/2014 | Sallas et al. | |

(Continued)

FOREIGN PATENT DOCUMENTS

| | | | |
|---|---|---|---|
| EP | 2764929 A2 | 8/2014 | |
| WO | WO-2019135100 A1 * | 7/2019 | ............. G01V 1/135 |

OTHER PUBLICATIONS

David McFarland et al., "DIVEBOT: A diving robot with a whale-like buoyancy mechanism," Robotica, 2003, pp. 385-398, vol. 21, No. 4.

(Continued)

*Primary Examiner* — Daniel Pihulic
(74) *Attorney, Agent, or Firm* — Patent Portfolio Builders PLLC

(57) ABSTRACT

Computing device, software and method for balancing forces acting on a piston of a marine vibrator towed in a body of water. The method includes estimating with a management system located on a vessel or a controller located on a marine vibrator, a transient pressure disturbance in the body of water; computing, at the controller, a force correction for the piston of the marine vibrator, based on the transient pressure disturbance; and instructing an actuation system of the marine vibrator to apply the force correction to the piston in anticipation of an arrival of the transient pressure disturbance.

20 Claims, 10 Drawing Sheets

(56) References Cited

U.S. PATENT DOCUMENTS

2015/0101420 A1 4/2015 Schneider et al.
2019/0212461 A1* 7/2019 Torres Tamanaja ..... G01V 1/04

OTHER PUBLICATIONS

K.S. Wasserman et al., "Dynamic buoyancy control of an ROV using a variable ballast tank," Oceans, San Diego, 2003.
Madis Listak et al., "Buoyancy Control of a Semiautonomous Underwater Vehicle for Environmental Monitoring in Baltic Sea," Department of Computer Engineering, Tallin University of Technology (Ehitajate) & Institute of technology Tartu University (Vanemuise), 2003.
Roemi Fernández et al., "Novel Robotic Platforms for the Accurate Sampling and Monitoring of Water Columns," Sensors (Basel, Switzerland), Sep. 2016, vol. 16, No. 9.
International Search Report and Written Opinion of the International Searching Authority (Forms PCT/ISA/220, PCT/ISA/210 and PCT/ISA/237) for corresponding International Application No. PCT/IB2018/001602, dated May 16, 2019.
Rao, A.K., et al., "ARMA Parameter Estimation Using a Novel Recursive Estimation Algorithm with Selective Updating," IEEE Transactions on Acoustics, Speech, and Signal Processing, vol. 38, No. 3, Mar. 1990, pp. 447-457.

* cited by examiner

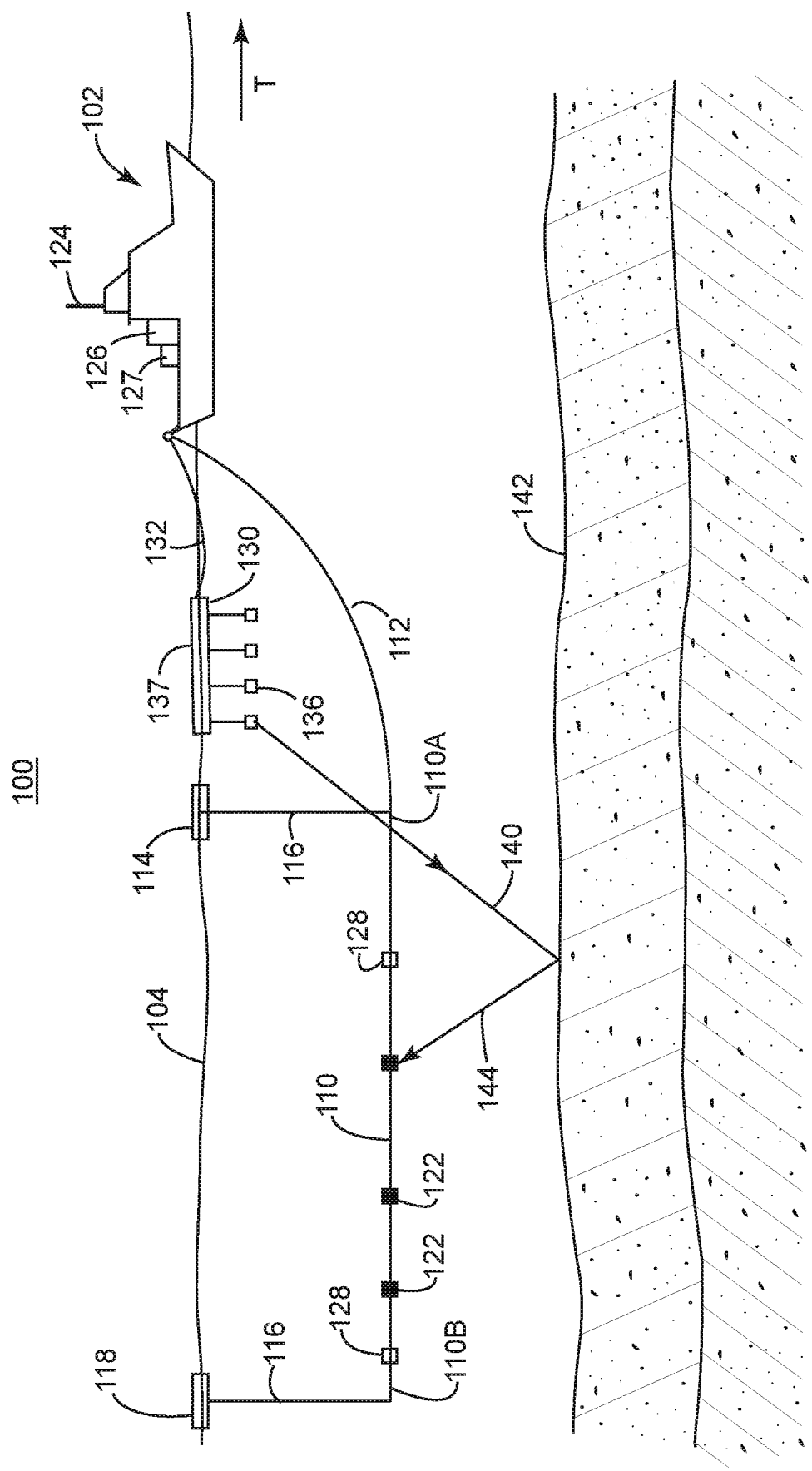

METHOD AND SYSTEM FOR HYDROSTATIC BALANCE CONTROL, BASED ON PRESSURE MODELLING, OF A MARINE SEISMIC VIBRATOR

BACKGROUND

Technical Field

Embodiments of the subject matter disclosed herein generally relate to methods and systems and, more particularly, to mechanisms and techniques for using a pressure disturbance forecast model with a marine vibrator.

Discussion of the Background

The oil and gas industry use geophysical prospecting techniques in the search for, or characterization of, subterranean hydrocarbon reservoirs and/or other mineral deposits. In marine seismic prospecting, a seismic source is used in a body of water to generate a seismic signal that propagates into the earth and is at least partially reflected by subsurface seismic reflectors. The reflections are recorded by seismic sensors located at the bottom of the sea or in a body of water at a known depth, and the resulting seismic data may be processed to generate an image of the earth, which is useful in evaluating the location and depth of the subsurface reflectors.

For many years, air gun sources (also known as impulsive sources) have been used in marine seismic acquisition to impart seismic waves into the earth. The use of an impulsive energy source can cause certain safety and environmental concerns. An alternative to air gun sources are marine vibrators, which can emit a wide variety of signal types, for example, a long tone with changing frequency (sweep signal) or a monotone signal or a band-limited, signal such as a pseudo-random signals, or other types of signals. Multiple marine vibrators can be configured to operate as source arrays to increase overall output, and/or to preferentially direct the energy to a desired underground location. The instantaneous pressure resulting from a marine vibrator source array will be lower than that of an air gun array, but the total acoustic energy transmitted by the vibrator source array will be quite similar to the air gun array, due to the extended duration of the signal.

However, marine vibrators operating at various depths (sometime in excess of 10 m) experience an increased ambient hydrostatic pressure. The increase in the ambient hydrostatic pressure is approximately 1 bar for every 10 m of added depth. For vibrators with large radiating surfaces, the resultant static force acting on these surfaces due to the hydrostatic pressure can become quite large, and in fact, these ambient generated forces may exceed the force capability of the linear actuator used to drive the marine vibrator.

In addition, transient pressure disturbances due to swells (surface gravity waves) can generate significant forces on the radiating surface (acoustic piston) that need to be counteracted by the sweep actuator to keep the piston from drifting too far away from its center position, to prevent limiting the available stroke of the piston during a sweep.

However, current marine vibrators either do not take into consideration the forces generated by the transient pressure disturbances and thus, they do not correct for these transient forces, or do not have the physical capability to correct for these transient forces as their existent pressure balancing systems are not designed to quickly supply the necessary flow of air to counteract the transient forces.

Thus, there is a need for taking into consideration the presence of the transient forces and providing or adjusting the existing pressure balancing systems for counterbalancing in an efficient way these transient forces.

SUMMARY

According to an embodiment, there is a method for balancing forces acting on a piston of a marine vibrator towed in a body of water. The method includes a step of estimating with a management system located on a vessel or a controller located on a marine vibrator, a transient pressure disturbance in the body of water, a step of computing, at the controller, a force correction for the piston of the marine vibrator, based on the transient pressure disturbance, and a step of instructing an actuation system of the marine vibrator to apply the force correction to the piston in anticipation of an arrival of the transient pressure disturbance.

According to another embodiment, there is a controller for balancing forces acting on a piston of a marine vibrator towed in a body of water. The controller includes an interface configured to receive an ambient pressure of the body of water and a processor connected to the interface. The controller is configured to estimate, based on the received ambient pressure, a transient pressure disturbance in the body of water, compute a force correction for the piston of the marine vibrator, based on the transient pressure disturbance, and instruct an actuation system of the marine vibrator to apply the force correction to the piston in anticipation of an arrival of the transient pressure disturbance.

According to still another embodiment, there is a method for adjusting a depth of a marine seismic element towed in a body of water. The method includes estimating with a management system located on a vessel or a controller located on the marine seismic element, a transient pressure disturbance in the body of water; and adjusting a depth of the marine seismic element, towed by the vessel, based on the estimated transient pressure disturbance.

According to still another embodiment, there is a non-transitory computer-readable-medium storing instructions, which when executed by a processor, implement the methods discussed herein.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 1A is a schematic diagram of a marine seismic acquisition system;

DETAILED DESCRIPTION

Figure 1B:
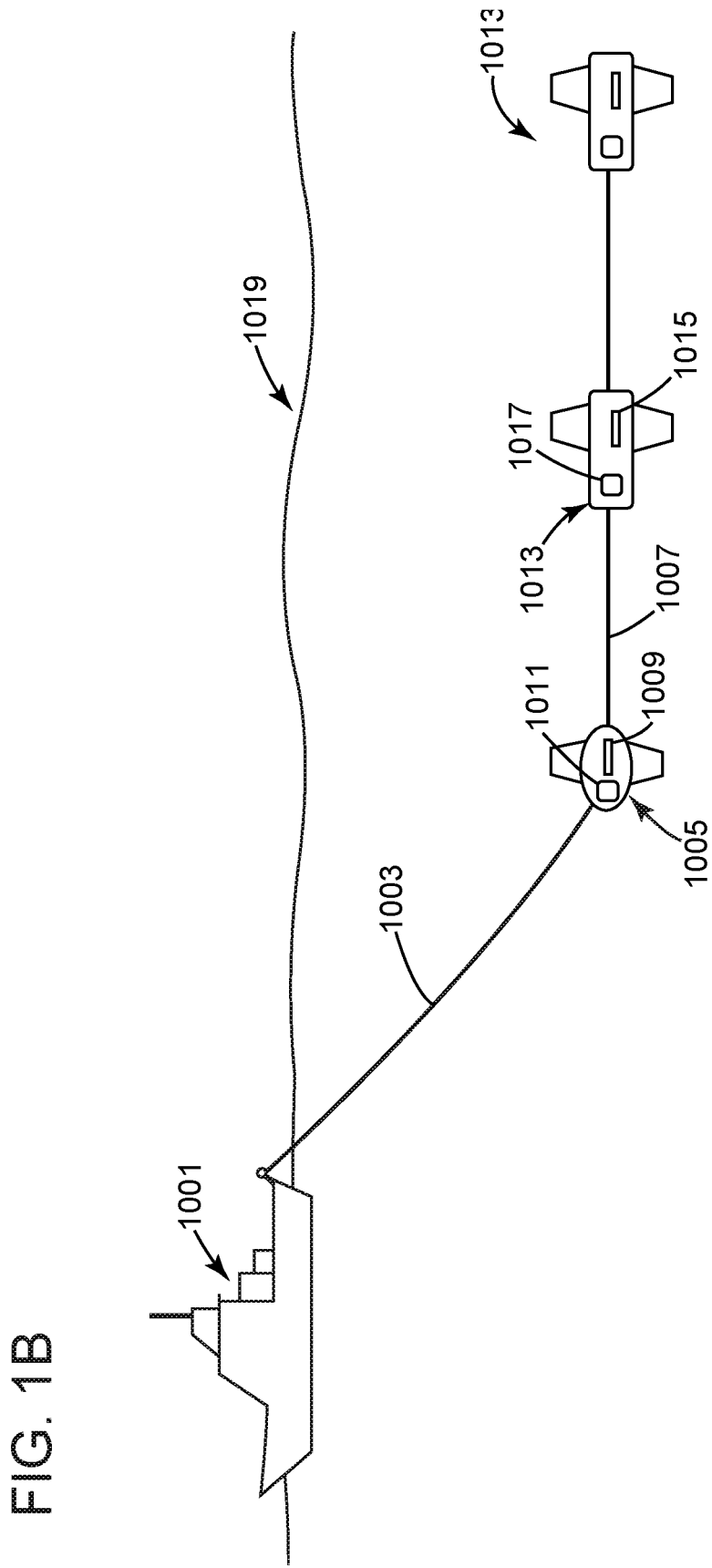
FIG. 1B is a schematic diagram of a marine vibrator towing scheme.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a marine source array that includes plural vibrators that generate acoustic energy in a marine environment. However, the embodiments to be discussed next are not limited to a marine source element; they may be applied to other source arrays.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As discussed above, during a transient pressure disturbance, the marine vibrator's pneumatic hydrostatic balance system needs to be active to compensate for the pressure disturbance. The hydrostatic balance system needs to supply an airflow for counteracting an increase in the ambient pressure, or to vent the air from the marine vibrator when the ambient pressure falls. The rate at which air can be supplied or vented from the marine vibrator may be limited due to the pneumatic components of the system, like hose size, accumulator volume, valve size and so on. Thus, there are situations when the pneumatic hydrostatic balance system cannot provide or vent the necessary amount of air to the marine vibrator to counteract the transient changes in the ambient pressure.

One cause of the transient pressure disturbance, and probably the main cause, is the ocean swells. Swells generally create low frequency (e.g., less than 1 Hz) narrowband pressure disturbances where the period of the disturbance falls in the range of about 6 to 12 s. The spectral content of these pressure disturbances is a function not only of the sea state (wave height), but also of the characteristics of the seafloor when operating in a coastal area. Seismic crews typically can operate in conditions in excess of Sea State 3 (0.5 to 1.25 m swells) and in some cases, up to Sea State 5 (2.5 to 4 m swells).

Thus, if a system for predicting or modelling the transient pressure disturbances is implemented in the control system of the marine vibrator, the hydrostatic balance system may be activated before the transient pressure occurs, to increase or decrease the pressure inside the marine vibrator. In other words, having a forecast of the pressure disturbance provided by the predicting system, the hydrostatic balance system can start, before the transient pressure disturbance affects the marine vibrator, to adjust the air pressure inside the marine vibrator, in anticipation of the pressure disturbance. With such a system, even a hydrostatic balance system that cannot adjust instantaneously the pressure inside the marine vibrator to balance the external transient pressure disturbance, can be given enough time to react to the incoming pressure disturbance, and to minimize the effect of the pressure disturbance.

Such a predicting system is now discussed and also its implementation into an existing marine vibrator.

Before explaining the details of the predicting system, a seismic survey system 100, as illustrated in FIG. 1A, is presented. The predicting system may be implemented in the seismic survey system 100 as discussed later. System 100 includes a vessel 102 that tows plural streamers 110 (only one is visible in the figure) and a seismic source 130. Streamer 110 is attached through a lead-in cable (or other cables) 112 to vessel 102, while source array 130 is attached through an umbilical 132 to the vessel. A head float 114, which floats at the water surface 104, is connected through a cable 116 to a head end 110A of streamer 110, while a tail buoy 118 is connected, through a similar cable 116, to a tail end 110B of streamer 110. Head float 114 and tail buoy 118 are used, among other things, to maintain the streamer's depth. Seismic sensors 122 are distributed along the streamer and are configured to record seismic data. Seismic sensors 122 may include a hydrophone, geophone, accelerometer, or a combination thereof. Positioning devices (also called birds, see for example, U.S. Pat. No. 7,610,871) 128 are attached along the streamer and controlled by a controller 126 for adjusting a position (vertical, lateral or both) of the streamer according to a survey plan.

Source array 130 has plural source elements 136, which are marine vibrators. A marine vibrator is described in U.S. Pat. No. 8,830,794, the entire contents of which are incorporated herein by reference. The marine vibrators are attached to a float 137 to be positioned at desired depths below the water surface 104. During operation, vessel 102 follows a predetermined path T while marine vibrators 136 emit seismic waves 140. These waves bounce off the ocean bottom 142 and other layer interfaces below the ocean bottom 142 and propagate as reflected/refracted waves 144 that are recorded by sensors 122. The positions of both the source element 136 and recording sensor 122 are estimated based on GPS systems 124 and recorded together with the seismic data in a storage device 127 onboard the vessel. Controller 126 has access to the seismic data and may be used to achieve quality control or even full processing of this data. Controller 126 may be also connected to the vessel's navigation system and other elements of the seismic survey system, e.g., birds 128.

An alternate marine vibrator towing scheme is shown in FIG. 1B. In this embodiment, a vessel 1001 tows, below sea surface 1019, via cable 1003, an underwater head module 1005, which is connected to one or more marine vibrator elements 1013 via an umbilical 1007. Vessel 1001 may also tow streamers (not shown) and/or be a separate source vessel. Cable 1003 and umbilical 1007 may contain a strain member, wires for electrical power distribution, communication lines (fiber optic, coaxial cable or electrical), hoses for carrying compressed air and/or hydraulic and/or cooling fluids. In addition, head module 1005 and marine vibrator element 1013 may be equipped with steering devices 1009 and 1015, respectively, to help control the depth and bearing of the head module and marine vibrator element so as to follow a predetermined source path. External steering devices (not shown) like birds may be located on towing cable 1003 and/or umbilical 1007 to facilitate marine vibrator positioning instead of, or in addition to, steering devices 1008 and 1015. Moreover, head module 1005 and marine vibrator element 1013 may respectively be equipped with electronic modules 1011 and 1017. Modules 1011 and 1017 can contain sensors and electronics suitable for receiving navigation/steering information/commands from the vessel and or a GPS receiver located on a surface float (not shown) and/or ultrasonic transceivers useful for relative location positioning and/or sensors suitable for depth monitoring, motion sensing (accelerometers, inclinometers, gyroscopes for example) and so on. Modules 1011 and 1017 may be equipped with communication devices suitable for exchanging information between themselves and/or a navigation system located on vessel 1001.

Figure 2:
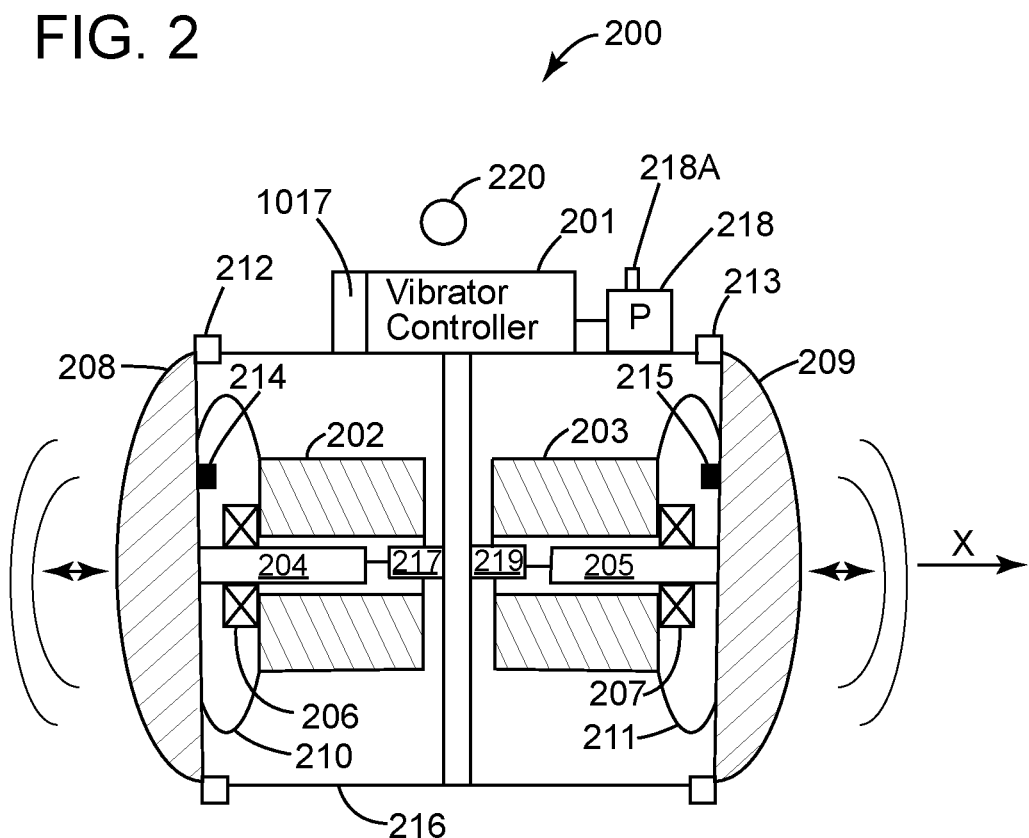
FIG. 2 illustrates a marine vibrator twin driver.

A source element or marine vibrator (these terms are used interchangeably in the following) is shown in FIG. 2. Source element 200 is a marine vibrator configured as a twin driver. The twin driver has two acoustic pistons 208 and 209 connected to corresponding moving shafts that include magnets 204 and 205. Magnets 204 and 205 interact with a magnetic field produced by electromagnetic windings 202 and 203 and move along axis X back and forth. Linear bearings 206 and 207 help maintain alignment of the driven structure, in conjunction with centering springs 210 and 211. Acoustic pistons 208 and 209 are connected to housing 216 via flexible seals 212 and 213 that allow axial motion of the acoustic pistons.

Sensors, for example, piston accelerometers 214 and 215, LVDTs 217 and 219 suitable for measuring the piston motion/position in conjunction with other sensors (not shown), for example, enclosure accelerometer, current sensors, voltage sensors, thermal sensors, pressure sensors, gyroscopes and so on can communicate with the vibrator local controller 201 to provide feedback control signals and/or monitoring information.

In this example, the vibrator local controller 201 receives as input two drive signals, one for each acoustic piston. The drive signals are used by the local controller 201 in combination with feedback signals from the various sensors, to provide signals to drive servo-amplifiers, that may be located within controller 201. Each electromagnet coil 202 and 203 has its own servo-amplifier to drive it. In addition, controller 201 may be in communication with and/or include within it electronic module 1017 (from FIG. 1B) to enable controller 201 to monitor and integrate and/or process information that can be used to help maintain acoustic piston 208 centering in the presence of pressure disturbances as part of the hydrostatic balance system discussed next.

The marine vibrator may also be equipped with a pneumatic hydrostatic balance system 218, to overcome the force exerted on the piston due to operation depth. Pneumatic hydrostatic balance system 218 may be controlled by controller 201 and receives pressured air from the umbilical of the source at port 218A. System 218 may distribute the pressured air to the inside of the marine vibrator or may vent the pressured air from the interior of the marine vibrator. A more detailed view of such pneumatic hydrostatic balance system is disclosed in U.S. Pat. No. 9,535,180, the entire disclosure of which is incorporated herein by reference. In an embodiment, the twin drive may be equipped with at least one receiver 220, for example, a hydrophone, for detection of the acoustic pressure signal near the marine vibrator (measured data). The output of receiver 220 may be in communication with the data acquisition system located within vibrator controller 201 and may be used to help monitor the vibrator and/or array acoustic output and/or to estimate array interaction forces impinging on acoustic pistons 208 and 209.

In another embodiment, acoustic pistons 208 and 209 are driven so that their motions mirror each other and thus, the two drive signals presented to the twin driver vibrator controller may be identical so that the reaction forces generated by the piston accelerations are balanced and the enclosure 216 remains relatively stationary.

The pressure disturbances that hydrostatic balance system 218 works to compensate for are due to one or more of the effect of swells (surface gravity waves) produced by wind acting on the sea, particle motion, underwater currents and hydrodynamic effects. The resulting phenomenon can be forecasted as now discussed. Swells have been studied and the modified Pierson-Moskowitz spectrum model is used for stochastic modeling of swells for a fully developed sea, as noted in equation (1):

$$S(f)=0.0175 \cdot T \cdot SWH^2 \cdot (fT)^{-5} e^{-0.44(fT)^{-4}}, \quad (1)$$

where T is the mean period of the waves, SWH is the significant wave height in meters (which is the mean wave of the one third highest waves), f is the frequency in Hz, and S is the power spectral density function (m²/Hz). For Sea State 4, SWH can be as great as 2.5 m and the period T falls in the range of 8 to 12 s.

Based on equation (1), at a depth "z" in meters, the resulting pressure disturbance amplitude spectrum W(f) (Pa/Hz$^{1/2}$), where f is the frequency in Hz, is given by equation (2), $$W(f)=\rho \cdot g \cdot [S(f)]^{1/2} \cdot e^{-4.03 \cdot z f^2}, \quad (2)$$

where ρ is the water density, and g is the gravitation constant (e.g., 9.8 m/s²).

An examination of equation (1) shows that the spectrum is heavily weighted toward very low-frequencies. Equation (2) shows that any upper frequencies present in equation (1) are rapidly attenuated with depth, to produce pressure disturbances at depth that are predominately very low-frequency disturbances. This means that the pressure disturbances are very low-frequency events with low bandwidth and thus, it is possible to create one or more models capable of forecasting the pressure disturbance values a few seconds in advance of the pressure disturbance affecting the marine vibrator. Such a model is disclosed later with regard to equations (3) to (5).

A hydrostatic balance control system for use with marine vibrators is described in U.S. Pat. No. 9,535,180. In practice, a 3-way pneumatic valve, when directed by a controller, connects the vibrator interior volume to a compressed air supply if the acoustic piston is pushed inward due to an increase in hydrostatic pressure that results in an imbalance in differential pressure. When the inside pressure is too high, the controller directs the 3-way pneumatic valve to connect the vibrator interior volume to an exhaust hose that vents air to the surface or to a low-pressure reservoir if a pump is used to recycle the air. The latter situation arises when the acoustic piston is pushed outward due to an imbalance in differential pressure resulting typically from a drop in the hydrostatic pressure.

Pneumatic hydrostatic balance of the marine vibrator's interior and the ambient can be difficult to maintain in practice, particularly at higher sea states. One issue, as discussed in the Background section, is that the air rate that can be vented is limited due to exhaust hose diameter or servovalve size. Because the difference in the marine vibrator's interior pressure and the ambient water pressure is, for example, 1.5 bar at 15 m depth, this can make it difficult to achieve high air exhaust flow rates through long hoses of reasonable diameter that may be reinforced to prevent wall collapse. The ability to vent air can be improved, but may require multiple hoses or larger hoses that are more difficult to handle and store and in cases may not be a viable option.

If the hydrostatic balance system cannot keep the acoustic piston centered in its housing, then the acoustic output of the marine vibrator needs to be reduced to avoid hitting the end of travel or due to other equipment constraints. Reduction in acoustic output can degrade the acquired seismic data quality.

This problem is solved by the embodiments as now discussed.

According to an embodiment, a pressure disturbance short-term forecaster system is developed and its prediction is integrated into the controller of the hydrostatic balance system for a marine vibrator. Although the following embodiments use a pneumatic hydrostatic balance system for achieving the pressure balance, these teachings are equally applicable to hydrostatic balance systems that use other means for balancing the pressure, for example, electromechanical means, to create a balance counter force. In still another embodiment, the hydrostatic balance system could be augmented to include means for maintaining a pressure balance by changing the depth of the marine vibrator and with the pressure disturbance short-term forecaster system providing information to the hydrostatic balance system to adjust the inclination of control vanes 1015 located on the marine vibrator 1013, vanes 1009 on head module 1005, or other devices, for example, birds (not shown) located on cables 1003 and/or 1007, winches located on the vessel 102 or float 137. In still another embodiment, it is possible to use the swell forecast information as part of a control system to correct for pitch and roll of the source and not just hydrostatic balance. The pitch and roll information from, for example, a gyroscope or inclinometer could be used as input to the pressure disturbance model discussed later.

Figure 3:
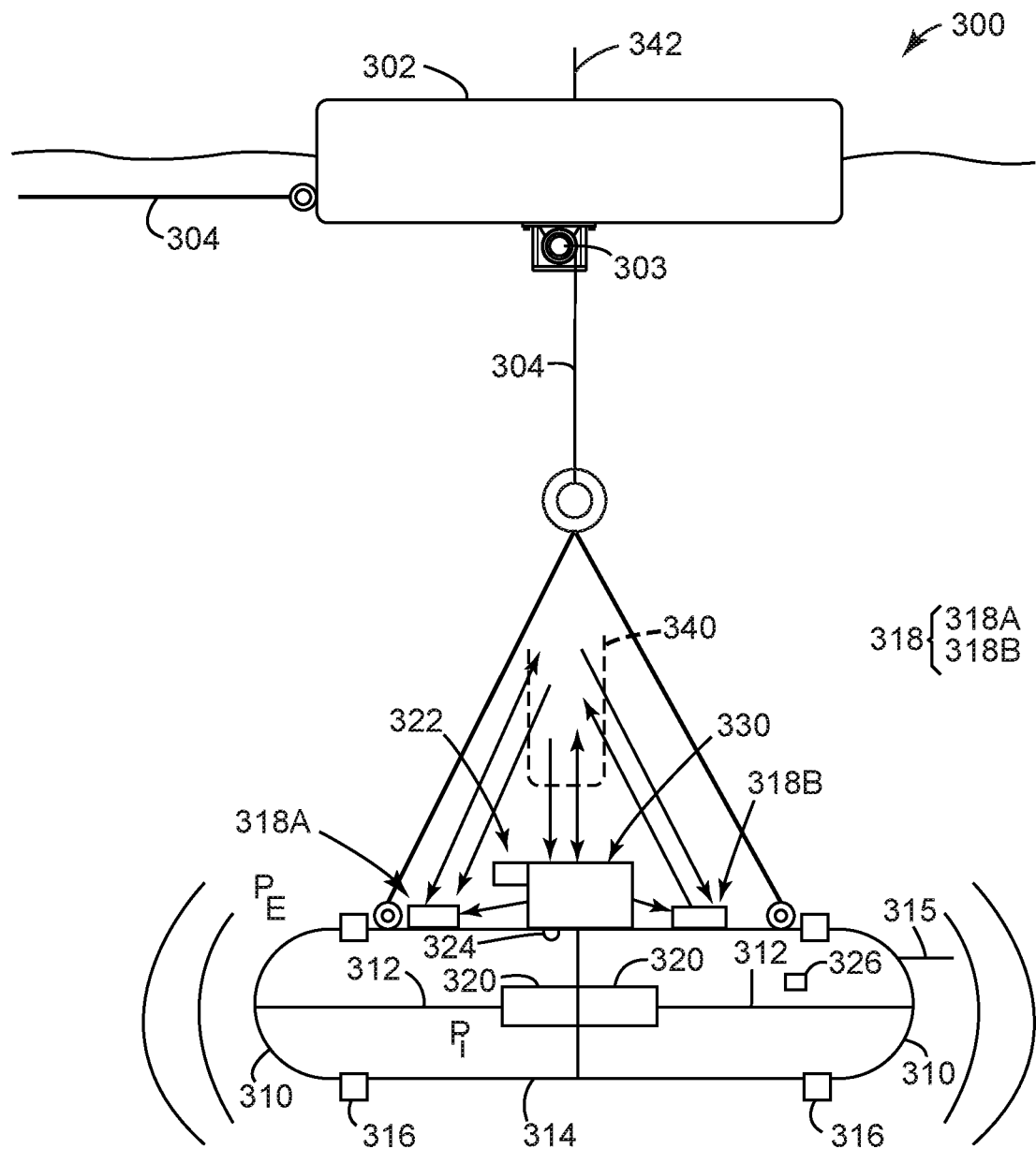
FIG. 3 illustrates a marine vibrator attached to a float.

FIG. 3 depicts a twin piston marine vibrator 300. The vibrator is deployed at a given depth (typically 2-50 m but other values are also possible) and, in an embodiment, may be suspended from a surface float 302 by means of chains or cables 304 that may also include some form of mechanical isolator to help isolate the vibrator from the heave of the float due to swells. In one embodiment, a winch 303 may be located on the float, to adjust a length of the links 304. Winch 303 may be connected to a heave compensation system (not shown) to mitigate jerks in links 304 and to help vibrationally isolate the vibrator 300 from the float motion. The vibrator 300 has pistons 310 that are driven by electromechanical linear actuators 320, whose armatures are connected to their respective acoustic pistons through a rod 312 that may have other support mechanisms, not shown, for example linear bearings. The vibrator 300 has a housing 314 that houses the pistons and the linear actuators. A seal 316 may be provided between each piston 310 and the housing 314 for preventing the ambient water from entering inside the housing. The housing 314 is typically pressurized with dry air so that the internal pressure Pi matches the external hydrostatic pressure Pe. In one embodiment, the marine vibrator or another source may have no float 302. In this case, one or more vanes 315 may be attached to the housing 314 and used for controlling a position of the source underwater (see, for example, FIG. 1B where vanes 1015 control the position of the marine vibrators 1013).

Because of the swells, the ambient hydrostatic pressure Pe changes. To compensate for this change, air needs to be supplied or vented from the housing 314 to help maintain a centering of the piston 310 and to reduce the net static force on the piston generated by the ambient water and the internal air. The net static force on the piston needs to be reduced (ideally to zero) so that the linear motor 320 need not supply any static force that may cause unwanted heating or excess current.

The housing 314 has an actuation system 318 (herein a hydrostatic balance system for simplicity, but this actuation system may be a mechanical system or an electrical system) that includes, in this embodiment, two 3-way pneumatic valves 318A and 318B that are directed by a controller 330 to supply or vent air to/from the interior of the housing 314. Also shown is FIG. 3 is a pressure transducer 322 that can be used to measure the ambient hydrostatic pressure Pe at the vibrator 300 and whose output is made available to the controller 330. In addition, a pressure transducer 324 for monitoring the internal pressure Pi can be used. FIG. 3 also shows the LVDT's or other displacement transducers 326 for measuring the positions of the pistons 310 relative to the center position.

The umbilical 340 may contain air hoses, strain members, power cables and communication cables that interconnect the vibrator 300 to an external power source (pneumatic or electrical for example) and to an external management system (e.g., vessel 102 shown in FIG. 1). A positioning system (e.g., GPS system) 342 may be located on the float 302 for measuring the position of the marine vibrator.

Figure 4:
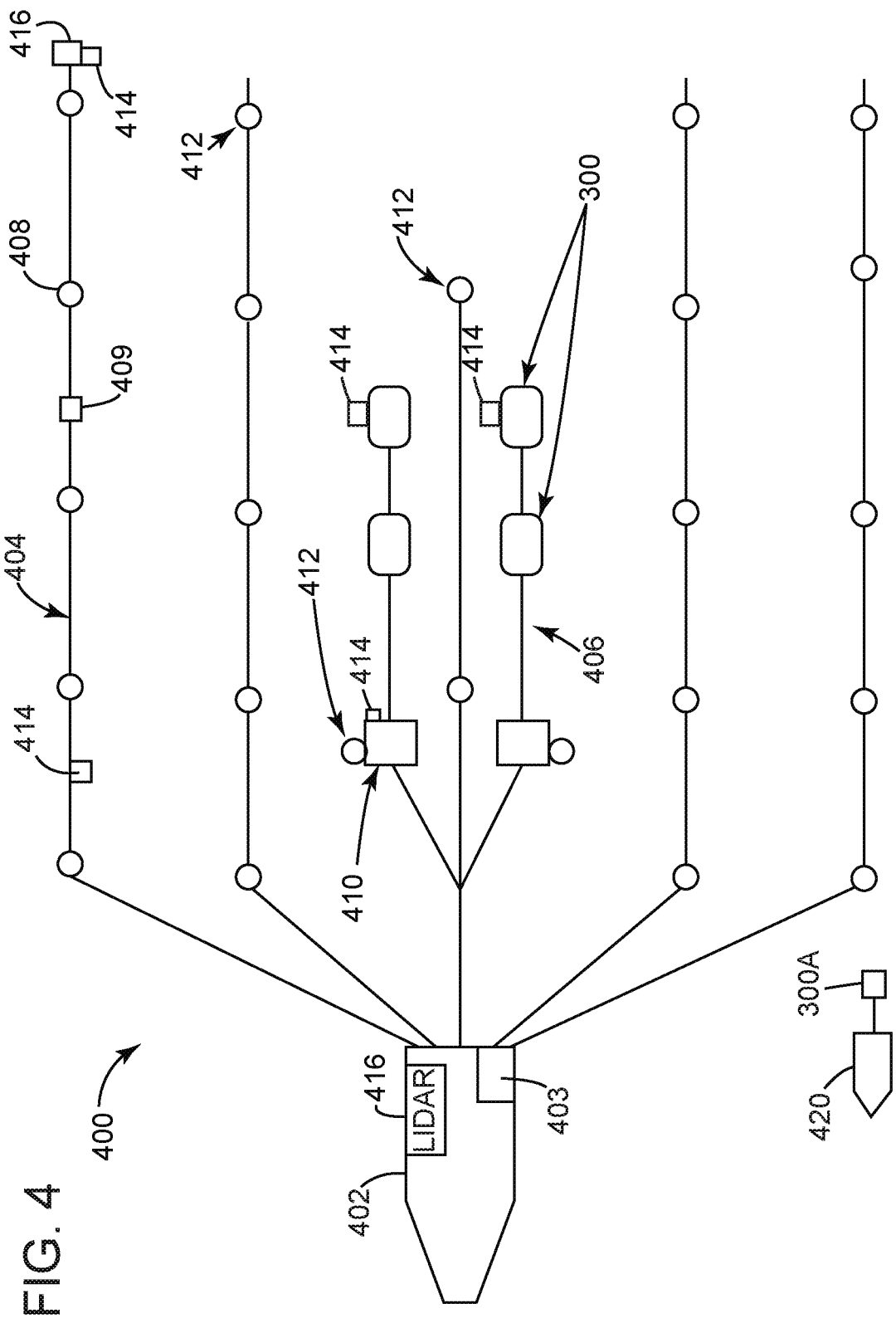
FIG. 4 illustrates a marine seismic acquisition system having additional sensors for estimating a transient pressure disturbance.

FIG. 4 illustrates a schematic view from above of a seismic acquisition system 400 in which a vessel 402 tows an array of vibrators 406 and an array of streamers 404. The array of vibrators 406 may include plural marine vibrators 300 as illustrated in FIG. 3. The array of streamers 404 includes streamers, which are typically equipped with hydrophone receivers 408 and can be more than 10 km in length. A modern seismic vessel may pull as many as 20 streamers in some cases. Each streamer may include one or more birds 409 (one is shown for simplicity) that are used for controlling a position of the streamer in water.

In FIG. 4, the vibrators 300 and their surface floats are towed in subarrays with a head module 410 at the front of each subarray. The head module 410 may contain air compressors, power converters, communication modules, data acquisition modules and other support equipment. In an embodiment, the head module 410 may also include some position control mechanism, for example, steering vanes to control lateral and/or depth of the vibrator subarray. The head module is also in communication with the vessel, which is equipped with a data acquisition/survey management system 403 used to direct the position of the sources and receivers. Plural pressure transducers 412 may be mounted at or near each vibrator for collecting pressure data, to be used for predicting the pressure disturbance.

In one embodiment, in addition to the pressure transducers 412 mounted at or near each vibrator 300, additional sensors 414 (capable of measuring low-frequency signals), located on the towed streamers 400 (or the hydrophones 408 that are used to receive the seismic signals if they are configured to record very low frequencies) and/or on located on the head module 410, and/or tail buoys 416 (located at the end of the streamers) and/or other vibrators or towed separately can be used to measure the pressure disturbance at some distance away from the one or more vibrators.

Because surface gravity waves typically propagate in the range of 2 to 4 m/s, the pressure transducers 414 located some distance away from a particular vibrator 300 may provide added information to improve the pressure disturbance forecasting. Other measurements, for example wind direction, wind speed, vessel speed and navigation information could be used in conjunction with the aforementioned pressure measurements to create a more sophisticated pressure disturbance forecast model capable of longer range prediction with higher accuracy.

In another embodiment, wave height measurements in the vicinity of a marine vibrator could be incorporated into the forecasting model. A wave height survey could be performed using, for example, a light detection and ranging (LIDAR) system 416 located on the vessel and/or using instrumented buoys and/or floats equipped with GPS receivers so that changes in water elevation could be monitored and transmitted to the survey management system 403 that is in communication with the marine vibrators 300.

In another embodiment, remotely controlled autonomous vessels 420 could tow vibrators 300A (similar to vibrators 300) and information could be exchanged between vibrators 300A and a support vessel so that ambient pressure information could be used to augment pressure disturbance measurements made near a particular vibrator.

Figure 5:
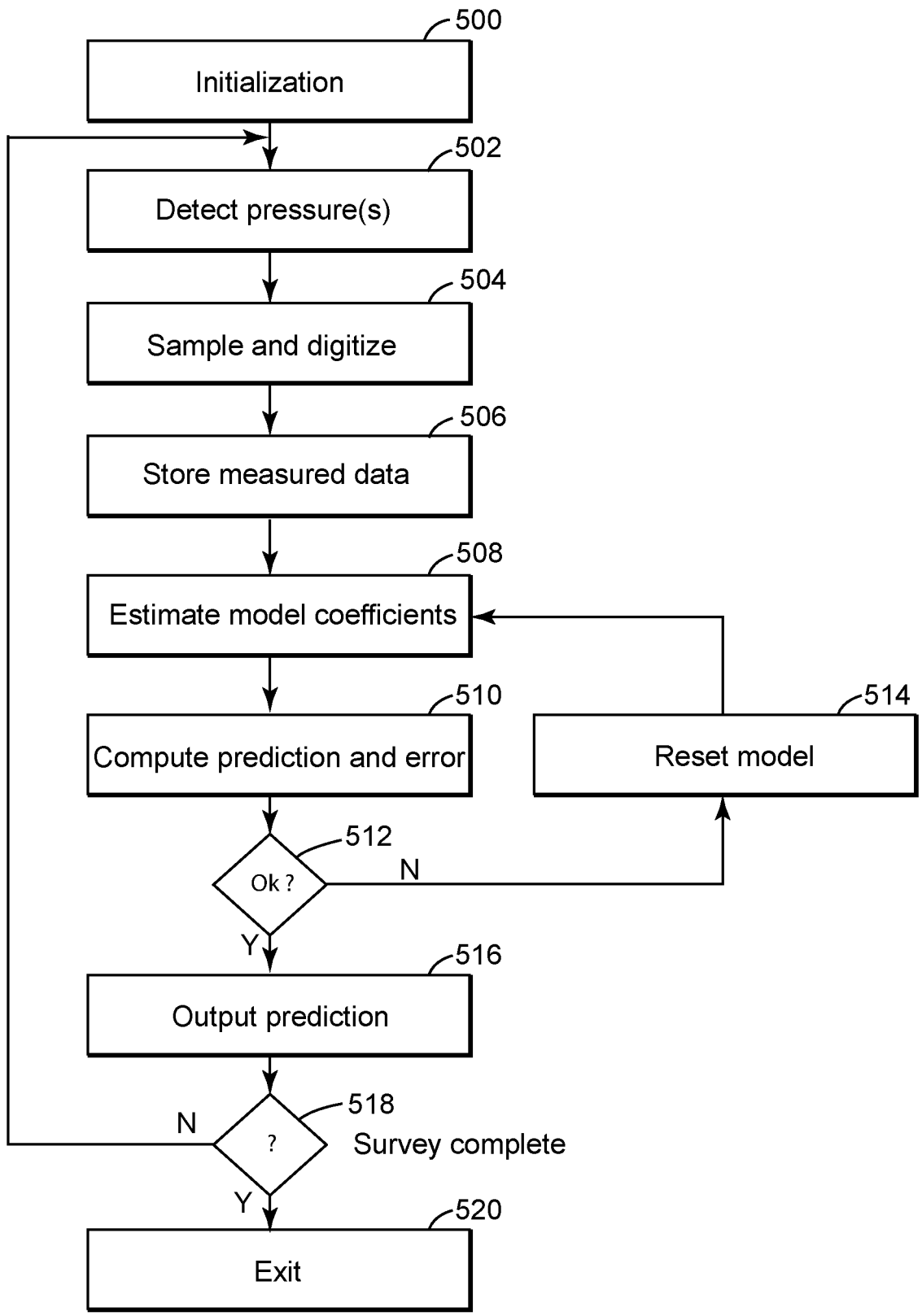
FIG. 5 is a flowchart of a method for estimating the transient pressure disturbance.

Having discussed the system that collects the data for forecasting pressure disturbances, a method for forecasting the pressure disturbances is now discussed with regard to FIG. 5. An objective of this method is to calculate/estimate, based on various measurements and a prediction model, a pressure disturbance for a particular vibrator location. The pressure disturbance predication is desired to provide in advance time (about 1 to 10 s) forecast estimate. The steps of this method may be locally implemented at the controller 330 of the vibrator 300, or globally at the management system 403 of the vessel 402, or they may be distributed between controllers 330 and 403. For simplicity, herein, the method assumes that the steps are implemented in the global management system 403 on board of vessel 402. The prediction model output can be used as an input to the controller 330, which controls the hydrostatic balance system (318A and 318B), to help anticipate an upcoming disturbance and allow the controller to supply or vent a volume of air beforehand from the housing 314 to reduce the peak demand requirements for the system.

There are different ways to create short-term forecast models for predicting pressure disturbances. The models are based upon an assumption that swells and the resultant pressure disturbance have some underlying relationship that is at least valid over a short term. In one embodiment, the prediction model may incorporate calculations made using time-domain data and utilize cross-correlation operations to estimate model parameters. In another embodiment, the prediction model may convert the time-domain measurements to the frequency-domain to identify dominant frequencies in a pressure disturbance signal, for example, through use of a fast Fourier transform (FFT) and/or utilize a frequency domain filter, for example, tracking filters or phase locked loop techniques. In another embodiment, the prediction model may include spatial, directional and/or velocity measurements as well as temporal measurements, for example, for a wave sensed at a distance at a measured location, the resultant arrival time of the corresponding pressure disturbance at the marine vibrator could be estimated. Various modelling methods may be used herein to forecast the pressure disturbances, for example, neural networks, Kalman filter, machine learning, recursive least squares time series, may be used for forecasting. In the following, a recursive least squares time series modelling method is used as an example, but those skilled in the art would understand that other models may be used.

In still another embodiment, a time series model, for example, a recursive ARMA (autoregressive moving average) model with a forgetting factor can be used to generate a forward pressure disturbance prediction. By employing a recursive model parameter estimate, the prediction model can be updated in real time. The forgetting factor is a way to weight current data more heavily than older data and allows the model parameter estimates to adapt to changes in the pressure disturbance at each vibrator, for example due to a change in the vibrator tow depth or movement, vessel heading, wind velocity and/or sea state.

In one embodiment, the ARMA model (some references call this an ARMAX model if exogenous input terms are included and some references call this an ARIMA model if a mean estimate is included like the term d in equation 3) used as the prediction model has an output described by "y" and an input described by "x." A term "d" is an offset term and a term "w" is the prediction error as illustrated in equation (3).

$$y(k) = a_1 y(k-1) + a_2 y(k-2) + \ldots + a_n y(k-n) + \\ b_1 x(k-1) + b_2 x(k-2) + \ldots + b_q x(k-q) + w(k) + \\ c_1 w(k-1) + c_2 w(k-2) + \ldots + c_m w(k-m) + d \quad (3)$$

This prediction model may be modified to accommodate more than one input. In this case, the autoregressive part is of order "n" (corresponding to the maximum lag of the output used) and the moving average part is of order "m" (corresponding to the maximum lag of the error used). The order of the input term is "q." In this model, the term k is the discrete time index and the time interval between k and k+1 corresponds to the data sampling interval. In practice, the raw data may be sampled at a high rate, for example, with a 1 ms sampling interval, but because pressure disturbances due to swell are typically very low-frequency in nature (less than 1 Hz), it is helpful to resample the data at a much lower sample rate, for example at a 1 s interval, for use by the ARMA forecast model. The time series model shown in equation (3) is a linear model, but in an embodiment, nonlinear terms could be included, such as inclusion of a nonlinear function of exogenous input terms.

Equation (4) below describes the one-step ahead predicted output $y(k)^*$:

$$y(k)^* = \\ a_1 y(k-1) + a_2 y(k-2) + \ldots + a_n y(k-n) + b_1 x(k-1) + b_2 x(k-2) + \\ \ldots + b_q x(k-q) + c_1 w(k-1) + c_2 w(k-2) + \ldots + c_m w(k-m) + d. \quad (4)$$

If $y(k)$ is the measured output and $y(k)^*$ is the predicted output, then equation (5) shows the difference between the actual measured output $y(k)$ and the predicted output $y(k)^*$, which is $w(k)$.

$$w(k) = y(k) - y(k)^*. \quad (5)$$

In an embodiment, the prediction model coefficients $a_i$, $b_j$, and $c_l$ are estimated such that a statistical variance of the forward prediction $w(k)$ is minimized.

In another embodiment, recursive least squares (RLS) algorithms are used for calculation of the time series model coefficients. RLS algorithms are known in the art, see, for example, Rao, Huang, Dasgupta, 1990, "ARMA Parameter Estimation Using a Novel Recursive Algorithm with Selective Updating," IEEE Transactions on Acoustics, Speech and Signal Processing, v38, no 3, 447-457. An algorithm to compute the coefficients of equations (3) and (4) can be implemented in a computing device to obtain a forward prediction of a pressure disturbance.

For this embodiment, "y" may represent the pressure disturbance (may represent the hydrostatic pressure or the change in hydrostatic pressure), for example, that is measured by a pressure sensor 412 or 414 that is in close proximity to a vibrator 300, as illustrated in FIG. 4, "x" may represent a measured input, for example, input "x" may be a filtered version of the vertical acceleration and/or control vane position and/or pitch and roll information from an inclinometer/gyroscope of the marine vibrator and/or float and/or head module or "x" could be the angular displacement/velocity/acceleration of winch 303 or could be the tension in suspension cable 304. In another embodiment, "x" may be a signal from another pressure sensor (e.g., sensor 408) or pressure sensor array that is some distance away from the vibrator and can provide information about a swell moving toward the vibrator. Measured wind speed and direction (for example the inline and/or crossline component of the wind speed) could also be incorporated in the model. In another embodiment, "y" may represent the acoustic piston position drift due to pressure disturbances, and in this case, it may be suitable for the input variable "x" to represent the linear actuator drive signal or actuator current or actuator voltage. Term "w" is the prediction error and "d" is an offset term. Note that the prediction model can be simplified if, for example, it is known that a reduced set of lag terms are adequate. In one application, only coefficients $a_2$ and $a_6$; $b_1$, $b_2$ and $b_5$; $c_3$ and $c_7$; and, d need to be estimated and the other coefficients may be assumed to be zero.

The method illustrated in FIG. 5, which may be implemented in a global controller 126 at the vessel (see FIG. 1A) or more likely in a local controller 330 (see FIG. 3) at the source, starts with an initialization step 500 in which a prediction model (determination of model order and what model terms are to be estimate may be based on prior experience) is selected (e.g., the model described by equations (3) to (5)) and the starting values for the prediction model coefficients are initialized (e.g., all the coefficients $a_i$, $b_j$, and $c_l$ are made zero). Note that equations (3) to (5) describe a single vibrator. If more vibrators are considered at the same time, a vectoral model may be used, where the output y becomes a vector with each entry corresponding to a single marine vibrator. The input x for the vectoral model also becomes a vector, with each entry corresponding to another pressure sensor. The initial values for the coefficients could also be set based upon prior knowledge about the sea conditions.

In step 502, various measurements are made with the sensors discussed in FIG. 4. These measurements may include, but are not limited to, pressure measurements. These measurements may also include piston accelerations, detected with sensor 326 discussed above with regard to FIG. 3. In one application, instead of using direct pressure measurements, a pressure estimate may be used, for example, based upon a vibrator piston position that has been corrected for the internal applied force due to the actuator and/or enclosure internal airflow.

In step 504, the measurements are sampled and digitized. For example, it is possible to include either a decimation filter, if the measured data is already digitized and is being re-sampled at a lower rate, or an anti-alias filter if the measurement is an analog signal. The measurements are then stored in a memory device in step 506, which may actually be a last-in first-out (LIFO) stack, whose length is determined by the prediction model's structure, i.e., number of different measurements and model order. The prediction model coefficients are estimated/updated in step 508, as well as the standard deviation of the prediction error w(k). The update may include a computation sub step of a covariance matrix and cross-correlation terms. In step 510, the prediction model is used to make a prediction of the pressure disturbance and, if the error standard deviation of the estimated pressure disturbance is determined in step 512 to be below a predetermined threshold PT (which depends on the seismic survey), the prediction is considered valid and the forecast is output in step 516 to the hydrostatic balance controller. If the standard deviation of the prediction error exceeds the predetermined threshold PT in step 512, for example, if there is a change in sea state and/or the vessel changes its heading and/or the source depth is changed, then the method advances to step 514, where the prediction model coefficients may be re-initialized and/or a different prediction model structure is selected. If this route is taken, the new or updated prediction model is used in step 508 to estimate the model coefficients and then the process makes a prediction in step 510, which is evaluated in step 512. As a result of performing step 514, the hydrostatic balance controller is notified that no forecast is available at this time. If the prediction model is reset in step 514, it may take some time for the model coefficients to converge to their new values. Thus, in one application, the hydrostatic balance controller may be instructed to disregard the forecast information for a predetermined time interval, corresponding to the time necessary for the coefficient estimates to converge. Another embodiment may have two or more models running at the same time. For example, two models with different orders or different inputs. One model may be appropriate for sea state 2 and the other model for sea state 3 or different models appropriate for different operating depths. Then, a comparison of prediction error standard deviation (or some other statistic) could be used to select which model is appropriate. This approach may be helpful if there are changes in wind speed or direction. If one model is converging while the other is diverging, it is possible to reset/ignore the divergent model and switch to the model that is well behaved. This may have the advantage of reducing the time the source operates without a valid pressure disturbance forecast.

After the forecast is output at step 516, the method verifies in step 518 whether the survey management system 403 has instructed to stop the method, for example, if the survey is complete, or if a pass is complete and the vessel is turning to make another pass. If the process is not stopped in step 518, then the method loops back to step 502 to take another pressure measurement. If the seismic survey was stopped in step 518, the method is terminated in step 520.

Figure 6:
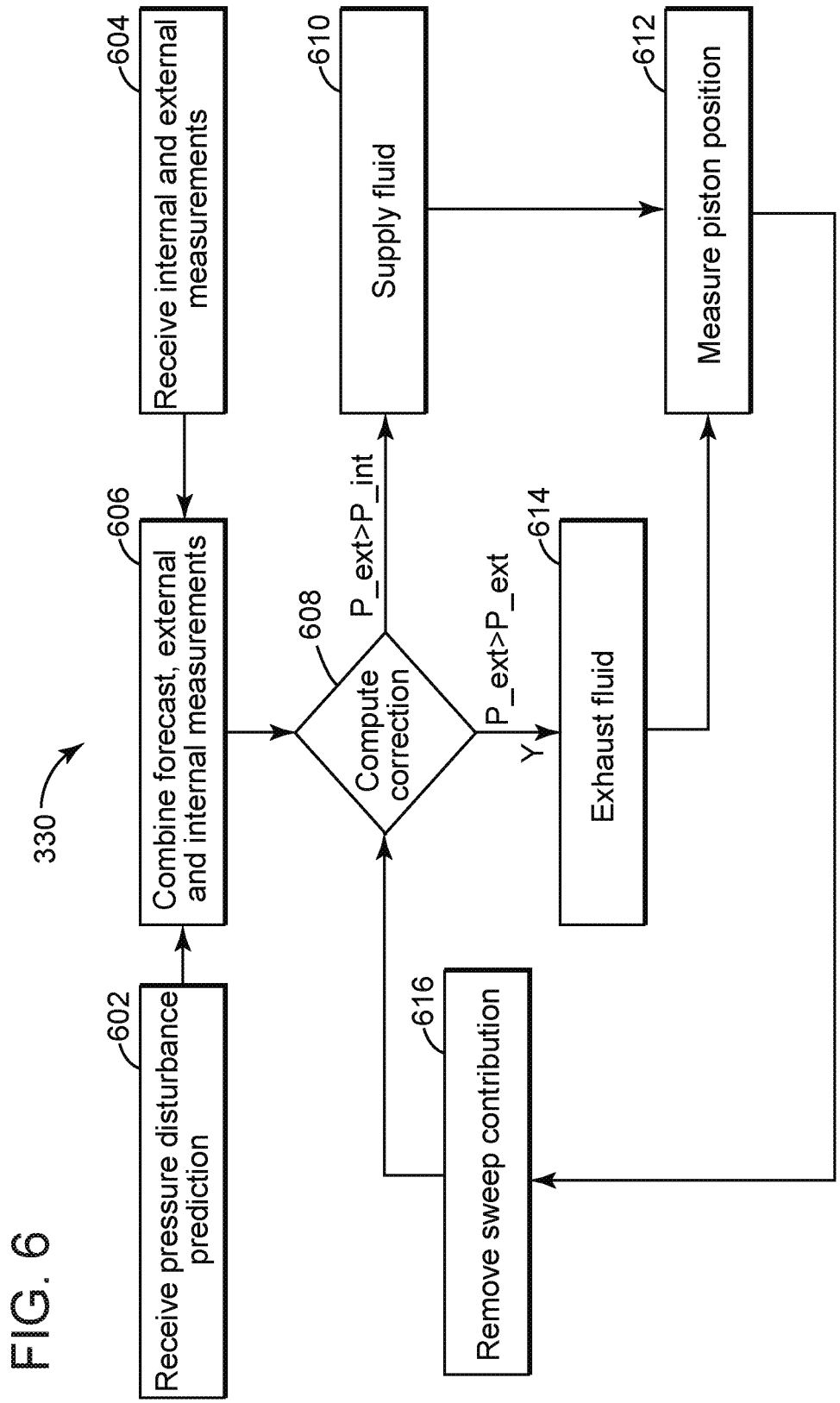
FIG. 6 illustrates a method for controlling an interior pressure of a marine vibrator based on the estimated transient pressure disturbance.

FIG. 6 schematically illustrates how the method discussed in FIG. 5 is implemented in the controller 330 of the marine vibrator 300. As previously discussed, controller 330 controls the hydrostatic balance system 318. Alternatively, the controller 330 can control a mechanical, electrical or pneumatic actuation system that directly or indirectly applies a force on the piston of the marine vibrator. Although FIG. 3 shows the hydrostatic balance system 318 as including only valves 318A, 318B, one skilled in the art would understand that this system may also include hoses, one or more accumulators (e.g., one located on the vessel and/or one located on the source array), or, instead of or in addition to the valves, a pneumatic ram that pushes against the piston of the marine vibrator to counter the force imbalance, etc. FIG. 6 shows the steps performed by the controller 330 for dynamically adjusting the pressure inside the marine vibrator (or the forces acting on the piston) for addressing the transient pressure disturbance that impacts one or more marine vibrators. Controller 330 receives in step 602 the transient pressure disturbance calculated according to the method of FIG. 5. The calculations associated with the method of FIG. 5 may be performed in the management system 403, or another computing device located on the vessel. Controller 330 also receives, in step 604, various internal and external measurements, for example, the ambient pressure Pe, the pressure inside Pi the marine vibrator 300, etc. This means that controller 330 is in communication with pressure transducer 322 and displacement transducer 326 or, controller 330 may receive all these measurements from the management system 403, which is able to receive measurements from all the sensors discussed above with regard to FIGS. 3 and 4.

This data is combined in step 606 at the controller 330 (or the data may be combined in the management system 403 and then supplied to the controller) and a force or pressure correction is computed in step 608. The pressure correction (which is related to the force correction as the force correction to be applied to the piston is the area of the piston times the pressure correction applied to the piston) may be related to increasing or decreasing the internal pressure of the marine vibrator over a given time period (e.g., 1 to 10 s), in anticipation of a transient pressure disturbance outside the marine vibrator. If the pressure correction is related to increasing the internal pressure (pressure disturbance would increase the ambient pressure Pe above internal pressure Pi), the controller 330 instructs in step 610 the hydrostatic balance system to supply more fluid (e.g., air) to the interior of the marine vibrator. Because this instruction is sent to the hydrostatic balance system with the given time period prior to the transient pressure disturbance affecting the marine vibrator, the hydrostatic balance system has enough time to supply the amount of fluid necessary to counteract the incoming pressure disturbance. Alternatively, if a force correction is used instead of the pressure correction, the force correction is applied to the piston of the marine vibrator so that a net force on the piston is substantially zero (which is equivalent to balancing the internal and external pressures). Note that the net force on the piston is calculated by taking into account the force exerted by the ambient water, the force exerted by the internal pressure of the marine vibrator and also the force applied by the actuator of the piston. The force correction may be applied with the pneumatic hydrostatic balance system 218 discussed above with regard to FIG. 2. One skilled in the art would understand that the force correction may also be applied with a pneumatic actuator located inside the marine vibrator, with an electric actuator, or with any other kind of actuator.

In step 612, the piston position inside the marine vibrator is measured, for example, with sensor 326 as shown in FIG. 3, and this information is provided to controller 330. If the pressure correction is related to decreasing the internal pressure (pressure disturbance would decrease the ambient pressure Pe below internal pressure Pi), the controller 330 instructs in step 614 the hydrostatic balance system to vent out fluid (e.g., air) from the interior of the marine vibrator. Alternatively, if the force correction is calculated, the controller 330 instructs the corresponding force actuator (mechanical, pneumatic or electrical) to apply a corrective force to the piston. Because this instruction is sent to the hydrostatic balance system (or another actuator) with the given time period prior to the transient pressure disturbance affecting the marine vibrator, the hydrostatic balance system has enough time to exhaust the amount of fluid necessary to counteract the incoming pressure disturbance.

After the piston's position is measured in step 612, the sweep contribution to the piston's position is removed in step 616, so that the controller 330 drives the hydrostatic balance system (or the other actuator) based on feedback related to the transient pressure disturbance and not based on the sweep that is applied to the piston for generating the seismic waves. In this regard, note that controller 330 also controls the movement of the piston for generating the seismic waves. This means, that controller 330 can be programmed to remove the sweep contribution when controlling the hydrostatic balance system, and to use only the sweep contribution when driving the actuator system 320 for generating the seismic waves. In one embodiment, controller 330 may be split in two different controllers, one that controls only the hydrostatic balance system 318, and one that controls only the actuator system 320. The output of step 616 is fed back to controller 330 for computing the pressure correction in step 608 for the next transient pressure disturbance. This loop method may be repeated during the entire duration of the seismic survey, or only when the swells have heights above a certain threshold.

While the prediction model of the transient pressure disturbance has been implemented in the controller 330 and used to balance an internal pressure of a marine vibrator to counteract the changes in the ambient pressure (or to balance the forces applied to the piston of the marine vibrator), the same prediction model may be used for other purposes. For example, in one application, it is possible to use the predicted pressure disturbance to adjust a depth of a source (see marine vibrator 1013 in FIG. 1B). For this type of source, its position is controlled with one or more vanes 1015 located on the body of the source. In order to maintain such a source at a given depth, the vanes are used to guide the source at the desired depth. However, when swells are present, the predicted pressure disturbance may be used to adjust the angle of the vanes to still maintain the source at the desired depth. If other means, like electric, pneumatic or hydraulic actuators, are used to create a hydrostatic balance force, it is anticipated that the predicted pressure disturbance can be applied to those control systems as well.

The predicted transient pressure disturbance may be used, in another embodiment, to adjust the depth of a marine vibrator that is attached to a float, as illustrated in FIG. 3. If swells are present, the depth of the marine vibrator may go up and down. Based on the calculated pressure disturbance, a winch 303 located on the float may be instructed to adjust a length of the links 304 to maintain the marine vibrator at the desired depth. In another embodiment, the calculated pressure disturbance could be used to control the operation of winch 303 located on the float, to adjust the tension in links 304 to improve heave compensation which may be important if the heave compensation system response time is limited and/or the objective is to track an isobar rather than to control marine vibrator depth. Isobar tracking is an alternate scheme for reducing the peak demand on the marine vibrator hydrostatic pressure compensation system.

In still another embodiment, if a swell/pressure disturbance forecast computation is performed by the survey management system on the vessel, the predicted pressure disturbance may be used to adjust the position of the birds (409 in FIG. 4) distributed along the streamer. As the seismic sensors need to be maintained at a given depth, any large swell affects the given depth. Thus, if the transient pressure disturbance to affect a seismic sensor is known in advance (with 1 to 10 s), the management system 403 may instruct one or more of the birds of the streamers to adjust the depth position of the seismic sensor so that the transient pressure disturbance brings back the seismic sensor to the predetermined depth. One skilled in the art would understand that the management system 403 may instruct different birds of the streamer spread to move with different amounts and/or along different directions (e.g., up or down) for adjusting the positions of the seismic sensors as the swells across the streamer spread are different. The management system 403 may use the seismic sensors measurements for estimating the transient pressure disturbance.

In another embodiment, the vessel and/or float of the seismic source may have a LIDAR device (see element 416 in FIG. 4) that may determine the height of the swells and the management system 403 may use the information from the LIDAR for calculating the transient pressure disturbance. The calculations in this and previous embodiments may be extended to all seismic sensors of the streamer spread.

Figure 7:
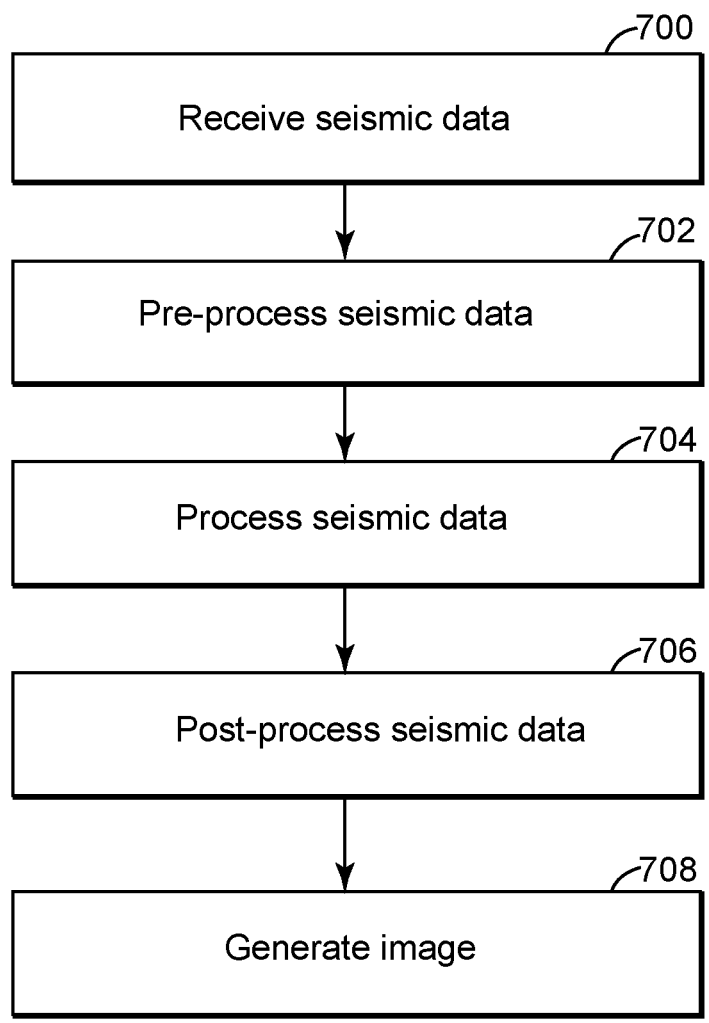
FIG. 7 is a flowchart of a method for processing acquired seismic data.

Seismic data generated by the seismic sources discussed above and acquired with the streamers also noted above may be processed in a corresponding processing device for generating an image of the surveyed subsurface as discussed now with regard to FIG. 7. For example, the seismic data generated with the source elements as discussed above may be received in step 700 at the processing device. In step 702, pre-processing methods are applied, e.g., demultiple, signature deconvolution, trace summing, motion correction, vibroseis correlation, resampling, etc. In step 704, the main processing takes place, e.g., deconvolution, amplitude analysis, statics determination, common midpoint gathering, velocity analysis, normal move-out correction, muting, trace equalization, stacking, noise rejection, amplitude equalization, etc. In step 706, final or post-processing methods are applied, e.g., migration, wavelet processing, seismic attribute estimation, inversion, etc.; in step 708 the final image of the subsurface is generated.

Figure 8:
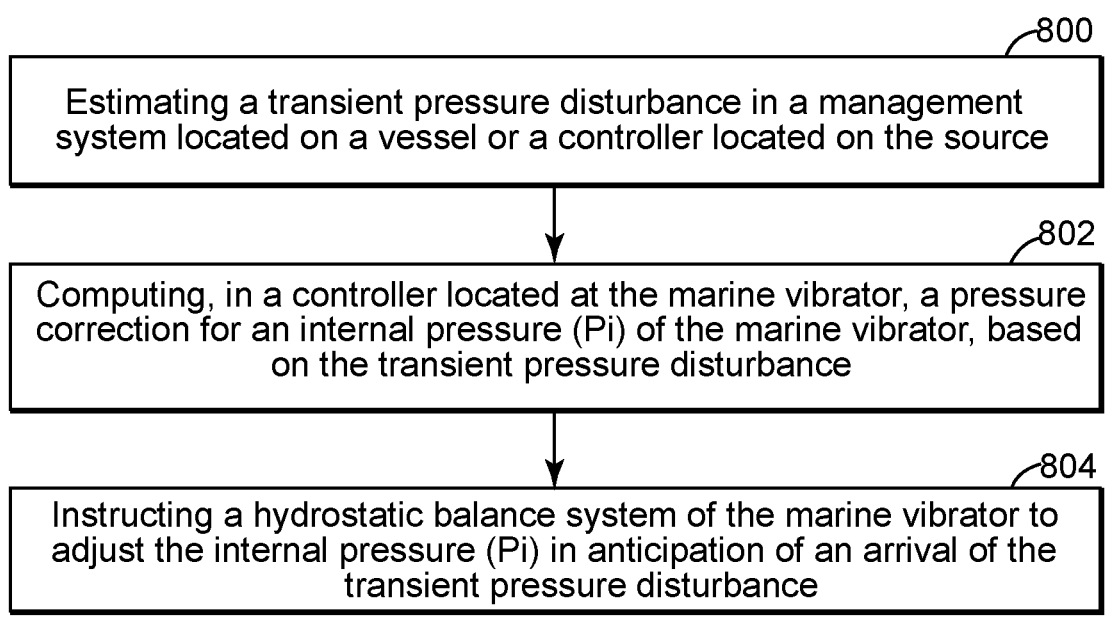
FIG. 8 is a flowchart of a method for balancing an interior pressure of a marine vibrator in anticipation of an arrival of a transient pressure disturbance.

A method for balancing a pressure inside a marine vibrator is now discussed with regard to FIG. 8. The method includes a step 800 of estimating a transient pressure disturbance in a management system located on a vessel or in a controller 330 located at the marine vibrator, a step 802 of computing, in a controller located at the marine vibrator, a pressure correction for an internal pressure (Pi) of the marine vibrator, based on the transient pressure disturbance, and a step 804 of instructing a hydrostatic balance system of the marine vibrator to adjust the internal pressure (Pi) in anticipation of an arrival of the transient pressure disturbance. The internal pressure (Pi) of the marine vibrator is adjusted to be substantially equal to an ambient pressure (Pe), at an instant when the transient pressure disturbance arrives at the marine vibrator. The term substantially in this context is understood to mean within a range of +/−20% of the ambient pressure.

Step 800 of the above discussed method may also be used to adjust a depth of a marine seismic element (e.g., source element, bird, streamer, etc.) towed in a body of water. After performing step 800, the method adjusts a depth of the marine seismic element, towed by the vessel, based on the estimated transient pressure disturbance. In one application, the method further includes a step of computing and updating parameters in a forecast model used for estimating a transient pressure disturbance. The forecast model may be a time series model. The method may also include a step of applying a recursive computation for updating model parameters.

Figure 9:
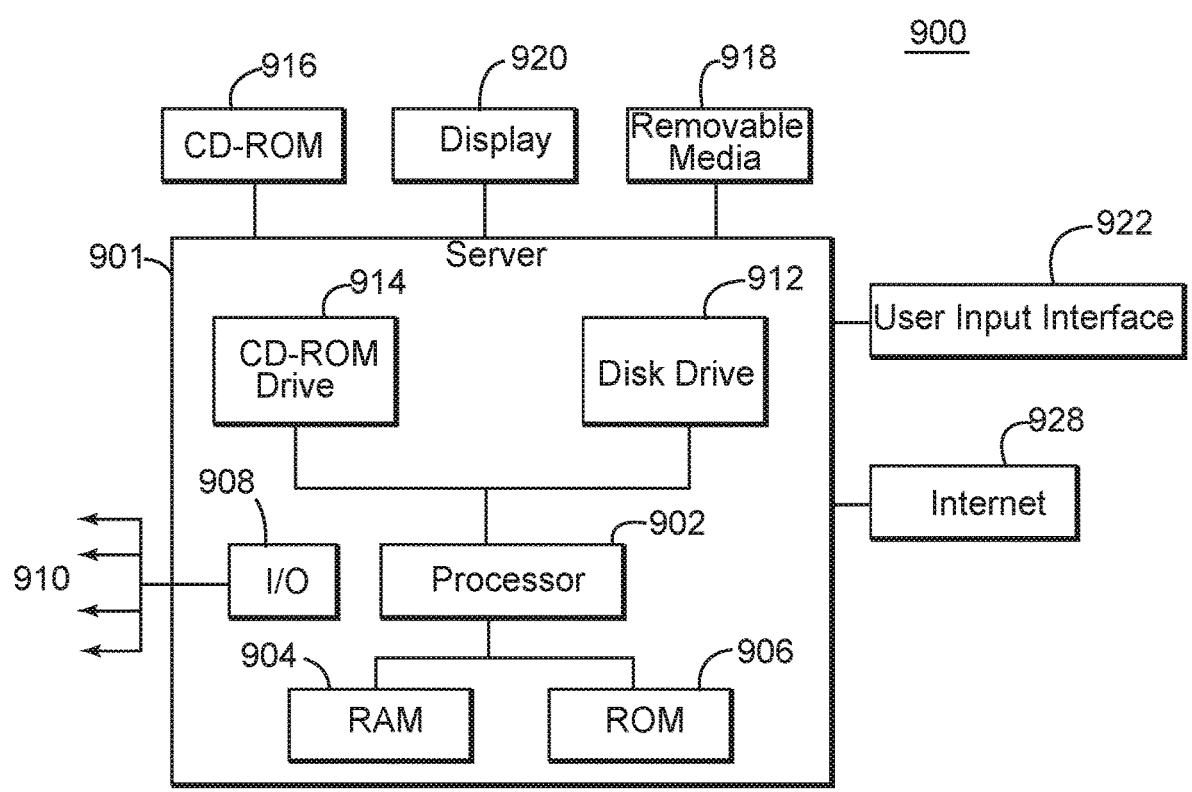
FIG. 9 is a schematic diagram of a control device.

An example of a representative controller (e.g., controller 330 or management system 403) capable of carrying out operations in accordance with the embodiments discussed above is illustrated in FIG. 9. Such a controller may be a processing device. Hardware, firmware, software or a combination thereof may be used to perform the various steps and operations described herein.

The processing device 900 suitable for performing the activities described in the exemplary embodiments (e.g., controller 300) may include server 901. Such a server 901 may include a central processor unit (CPU) 902 coupled to a random access memory (RAM) 904 and/or to a read-only memory (ROM) 906. The ROM 906 may also be other types of storage media to store programs, such as programmable ROM (PROM), erasable PROM (EPROM), etc. Processor 902 may communicate with other internal and external components through input/output (I/O) circuitry 908 and bussing 910 to provide control signals and the like. For example, processor 902 may communicate with the various elements of each source element. Processor 902 carries out a variety of functions as are known in the art, as dictated by software and/or firmware instructions.

Server 901 may also include one or more data storage devices, including disk drives 912, CD-ROM drives 914, and other hardware capable of reading and/or storing information, such as a DVD, etc. In one embodiment, software for carrying out the above-discussed steps may be stored and distributed on a CD-ROM 916, removable media 918 or other form of media capable of storing information. The storage media may be inserted into, and read by, devices such as the CD-ROM drive 914, disk drive 912, etc. Server 901 may be coupled to a display 920, which may be any type of known display or presentation screen, such as LCD, plasma displays, cathode ray tubes (CRT), etc. A user input interface 922 is provided, including one or more user interface mechanisms such as a mouse, keyboard, microphone, touch pad, touch screen, voice-recognition system, etc.

Server 901 may be coupled to other computing devices, such as the equipment of a vessel, via a network. The server may be part of a larger network configuration as in a global area network (GAN) such as the Internet 928, which allows ultimate connection to various landline and/or mobile client/watcher devices.

As also will be appreciated by one skilled in the art, the embodiments may be embodied in a wireless communication device, a telecommunication network, as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such a floppy disk or magnetic tape. Other non-limiting examples of computer-readable media include flash-type memories or other known types of memories.

This written description uses examples of the subject matter disclosed to enable any person skilled in the art to practice the same, including making and using any devices or systems and performing any incorporated methods. For greater clarity, the figures used to help describe the invention are simplified to illustrate key features. For example, figures are not to scale and certain elements may be disproportionate in size and/or location. The patentable scope of the subject matter is defined by the claims, and may include other examples that occur to those skilled in the art. Such other examples are intended to be within the scope of the claims. Those skilled in the art would appreciate that features from any embodiments may be combined to generate a new embodiment.

The disclosed embodiments provide a system and method for balancing an internal pressure of a marine vibrator due to transient pressure disturbances. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for balancing forces acting on a piston of a marine vibrator towed in a body of water, the method comprising:
   estimating with a management system located on a vessel or a controller located on a marine vibrator, a transient pressure disturbance in the body of water;
   computing, at the management system or the controller, a force correction for the piston of the marine vibrator, based on the transient pressure disturbance; and
   instructing an actuation system of the marine vibrator to apply the force correction to the piston in anticipation of an arrival of the transient pressure disturbance.

2. The method of claim 1, wherein the force correction corresponds to a pressure to be added or subtracted from an internal pressure (Pi) of the marine vibrator.

3. The method of claim 2, wherein the internal pressure (Pi) of the marine vibrator is adjusted to balance an ambient pressure (Pe), at an instant when the transient pressure disturbance arrives at the marine vibrator and affects the ambient pressure (Pe).

4. The method of claim 1, wherein the step of estimating comprises:
   measuring an ambient pressure away from the marine vibrator; and
   calculating, based on a prediction model, the transient pressure disturbance by taking into account the measured ambient pressure away from the marine vibrator.

5. The method of claim 4, wherein the prediction model is run in the management system.

6. The method of claim 4, wherein the step of measuring includes using plural sensors distributed on a source array for measuring the ambient pressure.

7. The method of claim 1, wherein the force correction corresponds to a pressure increase.

8. The method of claim 1, wherein the force correction corresponds to a pressure decrease.

9. The method of claim 8, further comprising:
   venting the interior of the marine vibrator until the transient pressure disturbance arrives at the marine vibrator.

10. The method of claim 1, further comprising:
    adjusting a vane, associated with the marine vibrator, based on the estimated transient pressure disturbance, for controlling a depth, pitch or roll of the marine vibrator.

11. The method of claim 1, further comprising:
    adjusting a position of a bird, associated with a streamer towed in parallel with the marine vibrator, based on the estimated transient pressure disturbance.

12. The method of claim 1, further comprising:
    adjusting a depth of the marine vibrator based on the estimated transient pressure disturbance.

13. A controller for balancing forces acting on a piston of a marine vibrator towed in a body of water, the controller comprising:
    an interface configured to receive an ambient pressure of the body of water; and
    a processor connected to the interface and configured to,
    estimate, based on the received ambient pressure, a transient pressure disturbance in the body of water,
    compute a force correction for the piston of the marine vibrator, based on the transient pressure disturbance, and
    instruct an actuation system of the marine vibrator to apply the force correction to the piston in anticipation of an arrival of the transient pressure disturbance.

14. The controller of claim 13, wherein the force correction corresponds to a pressure to be added or subtracted from an internal pressure (Pi) of the marine vibrator.

15. The controller of claim 14, wherein the internal pressure (Pi) of the marine vibrator is adjusted to balance an ambient pressure (Pe), at an instant when the transient pressure disturbance arrives at the marine vibrator and affects the ambient pressure (Pe).

16. A method for adjusting a depth of a marine seismic element towed in a body of water, the method comprising:
    estimating with a management system located on a vessel or a controller located on the marine seismic element, a transient pressure disturbance in the body of water; and
    adjusting a depth of the marine seismic element, towed by the vessel, based on the estimated transient pressure disturbance.

17. The method of claim 16, wherein the marine seismic element is one of a vibratory element, air gun, bird, or streamer.

18. The method of claim 16, further comprising:
    computing and updating parameters in a forecast model used for estimating the transient pressure disturbance.

19. The method of claim 18, wherein the forecast model is a time series model.

20. The method of claim 18, further comprising:
    applying a recursive computation for updating model parameters.

* * * * *